Dec. 22, 1931. W. N. THORNBURGH 1,837,379
DUST GUARD
Filed Oct. 26, 1927 4 Sheets-Sheet 1

INVENTOR.
W.N.Thornburgh
BY Knight Bros
ATTORNEYS

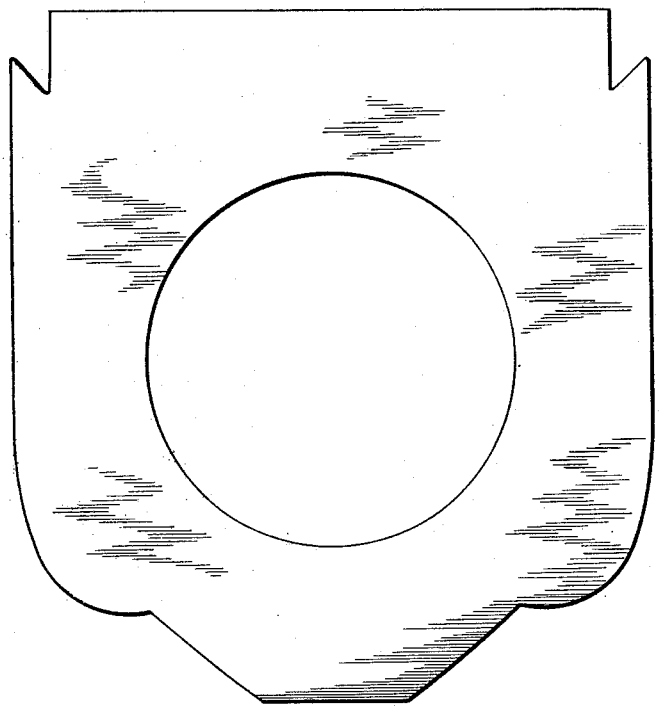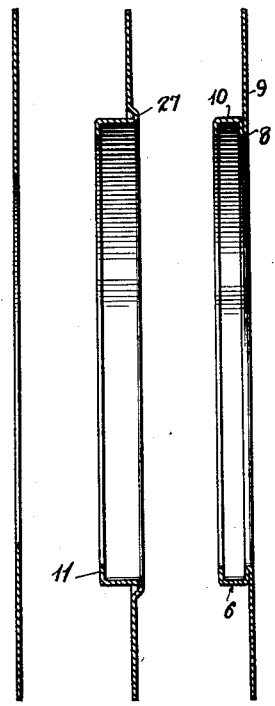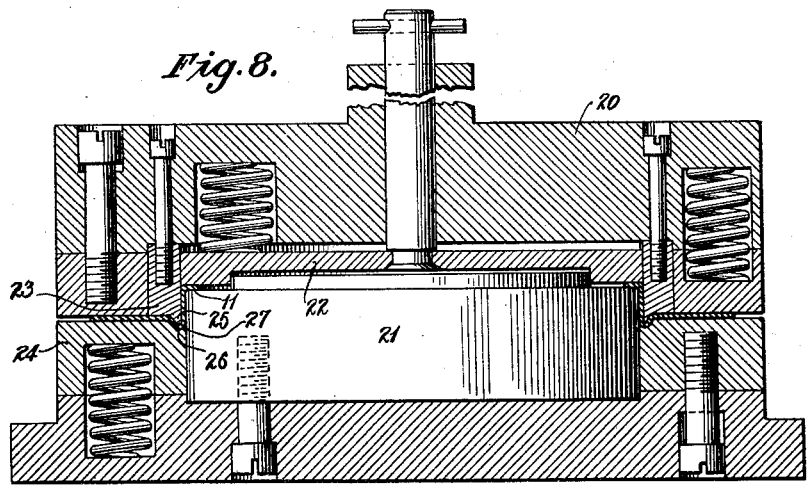

Dec. 22, 1931.  W. N. THORNBURGH  1,837,379
DUST GUARD
Filed Oct. 26, 1927   4 Sheets-Sheet 3

INVENTOR.
W.N.Thornburgh
BY Knight Bros.
ATTORNEYS

Dec. 22, 1931.  W. N. THORNBURGH  1,837,379
DUST GUARD
Filed Oct. 26, 1927   4 Sheets-Sheet 4

INVENTOR.
W.N.Thornburgh
BY Knight Bros
ATTORNEYS

Patented Dec. 22, 1931

1,837,379

UNITED STATES PATENT OFFICE

WILLIAM N. THORNBURGH, OF CICERO, ILLINOIS, ASSIGNOR TO W. N. THORNBURGH MANUFACTURING CO., OF CICERO, ILLINOIS, A CORPORATION OF ILLINOIS

DUST GUARD

Application filed October 26, 1927. Serial No. 228,880.

This invention relates to a dust guard for car axles and has for its object to provide an effective and substantial guard which can be produced at a minimum expense. The guard consists of a single layer sheet metal plate having an integral gasket channel-flange drawn on the periphery of the axle aperture.

I am aware that dust guards have been made heretofore of wood, or cast metal, or two layers of sheet metal, with a gasket channel in the portion surrounding the axle. However each of the above types of guards has certain disadvantages. The wooden guard has a tendency to split in use. The cast metal guard requires more metal than a sheet metal guard to provide the necessary strength and is therefore heavier and the cost is prohibitive. The two layer sheet metal guard requires twice the metal used in my single layer guard and this item is particularly important because of the large disk cut from each sheet to form the axle aperture which is wasted and cannot even be sold as scrap.

The invention is applicable to either single piece dust guards or so called compensating dust guards consisting of two relatively slidable sections pressed against the axle by means of springs.

Another feature of the invention is a small spacer which holds the gasket expanded to facilitate assembly on the axle and which is thin enough to wear out quickly and allow the gasket to close around the axle.

Figure 1:
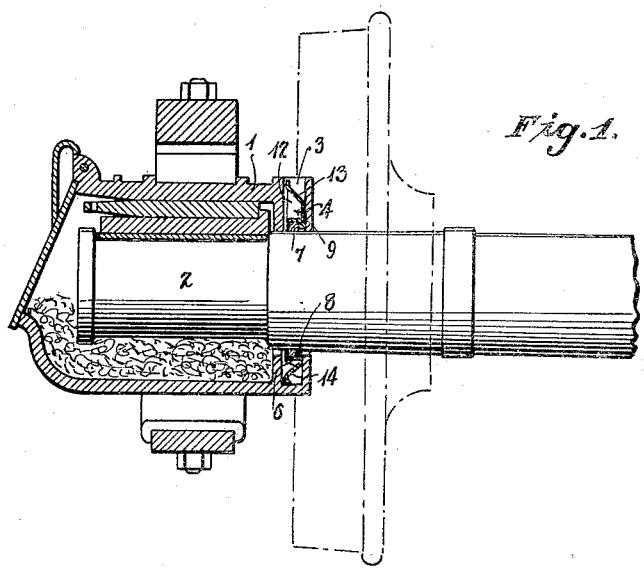
Figure 2:
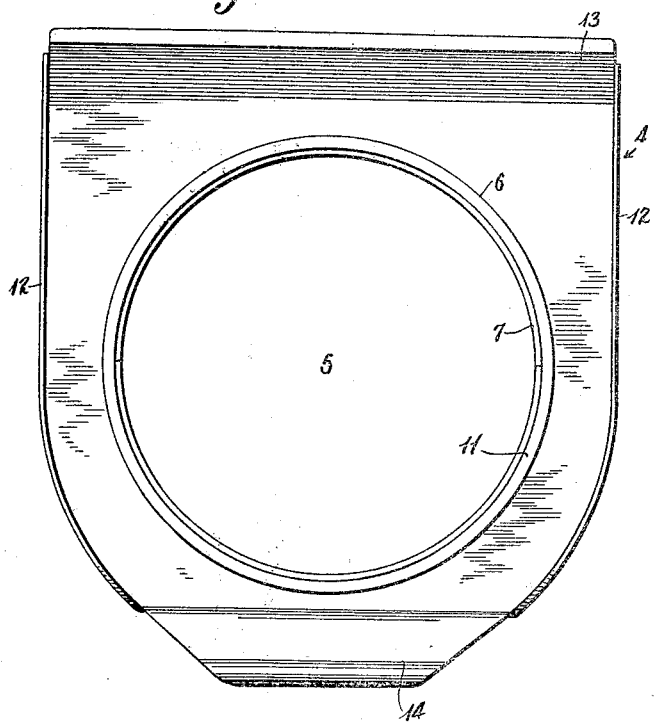
Figure 3:
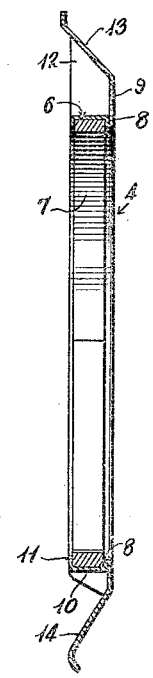
Figure 9:
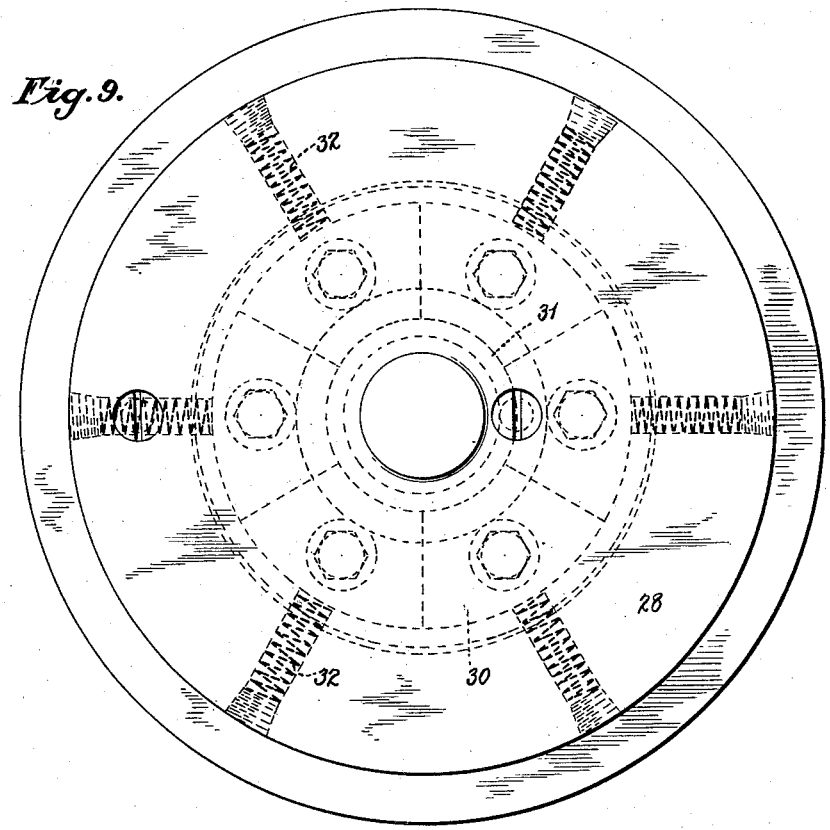
Figure 10:
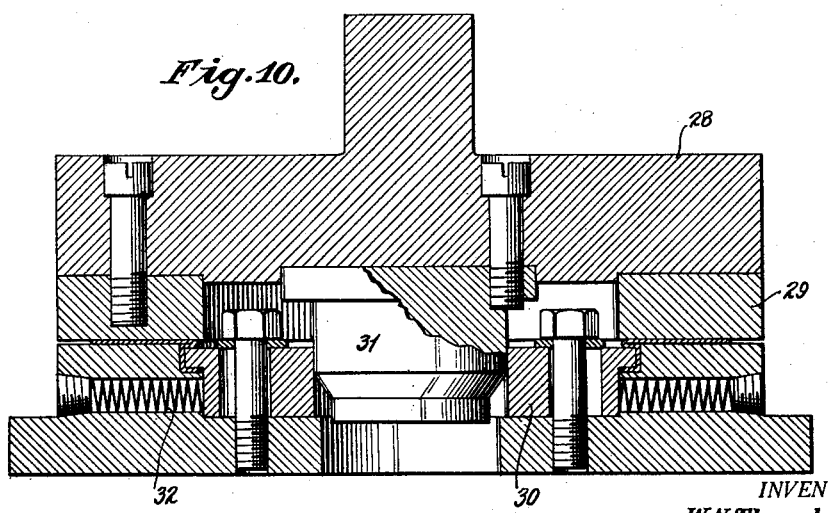
Figure 11:
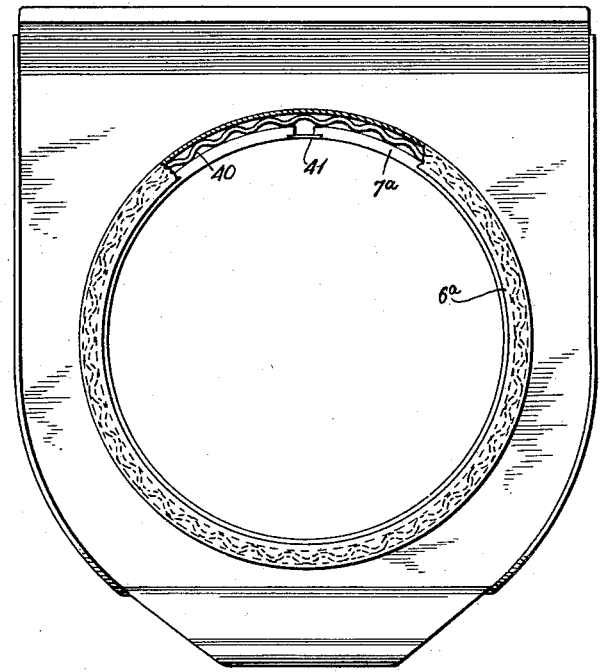
Figure 14:
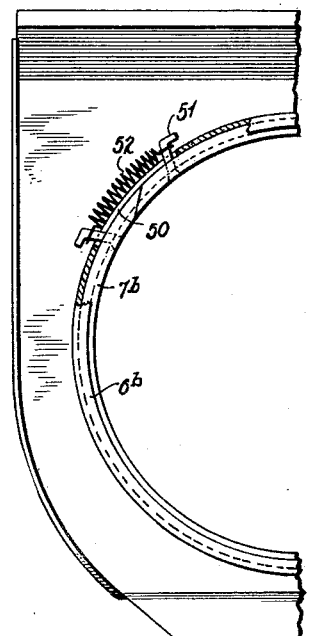
Figure 12:
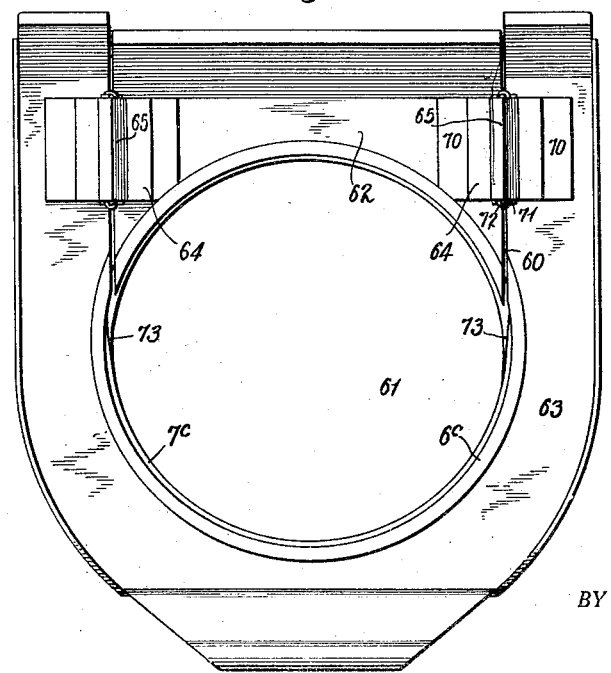
Figure 13:
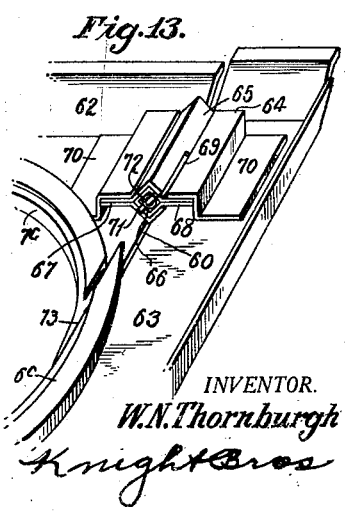

The invention will be described in detail in connection with certain illustrative embodiments thereof shown in the accompanying drawings in which Fig. 1 is a longitudinal section of a bearing box, wheel, and axle showing the dust guard in operative position, Fig. 2 is an elevation of the dust guard, Fig. 3 is a central vertical section of the dust guard, Fig. 4 is an elevational view of a stamped blank ready to be drawn, Fig. 5 is a central section of the blank, Fig. 6 is a central section of the blank after the first drawing operation, Fig. 7 is a central section of the blank after the second drawing operation, Fig. 8 is an axial section of the die used for the first drawing operation, Fig. 9 is a plan view of the die used for the second drawing operation, Fig. 10 is an axial section of the die used for the second drawing operation, Fig. 11 is an elevation partly in section of a modified form of dust guard, Fig. 12 is an elevation of a compensating dust guard embodying my invention, Fig. 13 is a detail perspective view of a portion of the guard shown in Fig. 12, and Fig. 14 is a fragmentary elevation partly in section of still another form of dust guard embodying my invention.

The bearing box 1, in which is journaled the axle 2, is provided with the customary dust guard slot 3 in which the dust guard 4 is held. The dust guard is made of a single sheet of metal in the center of which is cut a circular aperture 5. The metal around the periphery of the aperture is drawn to form a gasket channel-flange 6 in which is placed a gasket 7 of leather or any other suitable material. The channel-flange 6 consists of a side wall 8 joined to the plate 9 around the circumference of the aperture 5 and lying parallel to the plate 9, a bottom wall 10 projecting outward from the side wall 8, and a retaining lip 11 on the outer edge of bottom wall 10.

The plate 9 is provided with lateral flanges 12, and top and bottom flanges 13 and 14. The flanges 13 and 14 are of such width that they fit snugly in the slot 3 but permit free vertical movement of the dust guard so that it can ride on the axle 2 with its gasket 7. The flange 13, which extends substantially all the way along the top of slot 3 serves to shed dirt falling into the upper end of slot 3 to the outer side of the dust guard.

While the inferior grade of sheet metal used for dust guards is not particularly adapted for being drawn, the channel-flange can be successfully made in the following manner:

A blank is stamped out in the form shown in Fig. 4. The blank is then placed in the die 20 shown in Fig. 8 and drawn into the form shown in Fig. 6. A central block 21 of die 20 presses out the metal which is to form the gasket groove 6. The outer lip 11 is bent down in the first operation by a plate 22. Outside of block 21 are arranged two rings 23 and 24 provided with cooperating shoulder and recess 25 and 26, whose function it is to form a mold 27, which, when straightened into alinement with the plate, will form the inner side of the gasket channel. After the first drawing operation the blank has the form shown in Fig. 6.

The next drawing operation is performed by the die 28 illustrated in Figs. 9 and 10. This die has a flat ring 29 which straightens the fold 27 into alinement with the body of the plate, and a series of radially movable segments 30 which expand the channel-flange into its final form. The segments 30 are moved outward by a wedge 31 and inward by springs 32. The partially completed guard when removed from the die 28 has the form shown in Fig. 7.

The side flanges 12 and top and bottom flanges are next turned up in a manner well known and the guard is ready to have the gasket inserted and clinched in place by bumping the sides of the groove against it.

In the finished dust guard the channel flange and the body of the guard are formed of the same continuous sheet of metal, by which I mean that the channel flange is formed by distortion of the sheet of metal of which the body of the guard is made, not by welding together separate pieces of sheet metal. The channel flange and its connection to the body of the guard therefore have the inherent strength of the original sheet metal and do not depend upon the degree of care with which a welding has been done—an important consideration in articles produced at a high rate of speed.

In Figs. 11 to 14 are shown three modified forms of dust guard. In the guard shown in Fig. 11 the metal portion is the same as that of the first form except that the channel-flange 6a is preferably a little deeper. A split gasket 7a is arranged in the groove 6a and is not clinched, but is free to move radially. Behind the gasket is a corrugated spring 40 which engages the base of the channel on one side and the gasket on the other and holds the gasket in close contact with the axle around its entire circumference, at the same time keeping the gasket concentric in the channel. To facilitate the insertion of the axle through the gasket a thin spacer 41 is inserted between the ends of the gasket to hold it expanded to the size of the portion of the axle upon which it is to ride. The spacer is made very thin so that it soon wears through and permits the gasket to be contracted upon the axle by spring 40. The corrugated spring and spacer can obviously be used with any form of dust guard having a gasket channel surrounding the axle aperture.

In Fig. 14 I have shown another form of spring device for contracting the gasket which can be used in connection with the outstanding channel-flange. In the channel-flange 6b there is an opening 50. The ends of the split gasket 7b are provided with hooks 51, and a tension spring 52 connecting these two hooks contracts the gasket around the car axle. A spacer can also be used with this modification to facilitate the insertion of the car axle.

The guard shown in Figs. 12 and 13 is of the same general form as the first described guard, but is cut along lines 60 tangent to the aperture 61 to form a section 62 slidable with relation to the other section 63. The two sections are connected together by interlocking guide members 64 which hold the sections in alinement but permit relative longitudinal movement. The guides 64 shown in the drawings are substantially the same as those shown in the Williams Patent No. 1,353,881 and I do not claim their particular form as my invention. They consist of telescoping tubes 65 and 66 having outwardly projecting flanges 67 and 68, the flange 68 extending through a slot 69 in tube 65. The flanges 67 and 68 are welded to brackets 70 which in turn are welded to the sections 62 and 63. The tube 65 has a tongue 71 at one end and the tube 66 has a similar tongue (not shown) at the opposite end. A spring 72 stretched between the two tongues draws the tubes together and thereby pulls section 62 toward the center of the aperture 61.

The gasket channel-flange 6c holds a gasket 7c which is diagonally split at two points 73 adjacent the points of tangency of the division lines 60. The gasket 7c is made of flexible or semiflexible material so that as it is worn and its ends slide relative to one another they will adapt themselves to the axle and maintain a tight joint.

Having described my invention, I claim:

1. A dust guard consisting of a plate formed of a single layer of sheet metal apertured to receive a car axle, the metal adjacent said aperture being bent into the form of a channel-flange surrounding said aperture, said channel-flange consisting of a side wall joined to said plate at the circumference of said aperture and lying parallel to said plate, a bottom wall projecting outward from said side wall, and a retaining lip on the outer edge of said bottom wall.

2. In a dust guard comprising a plate apertured to receive an axle, a gasket channel around the periphery of said aperture, a split gasket in said channel, resilient means for radially contracting said gasket and a spacer of thin material inserted between the ends of said gasket for temporarily holding the same expanded to facilitate assembling the guard on the axle.

3. A dust guard comprising a plate apertured to receive a car axle and an inwardly opening substantially U-shaped channel flange surrounding said aperture, said plate and channel being formed of a single continuous sheet of sheet metal.

WILLIAM N. THORNBURGH.